Dec. 16, 1952     K. R. HAVERKAMP     2,621,536
POWER TAKE-OFF CONTROL
Filed May 11, 1951     2 SHEETS—SHEET 1
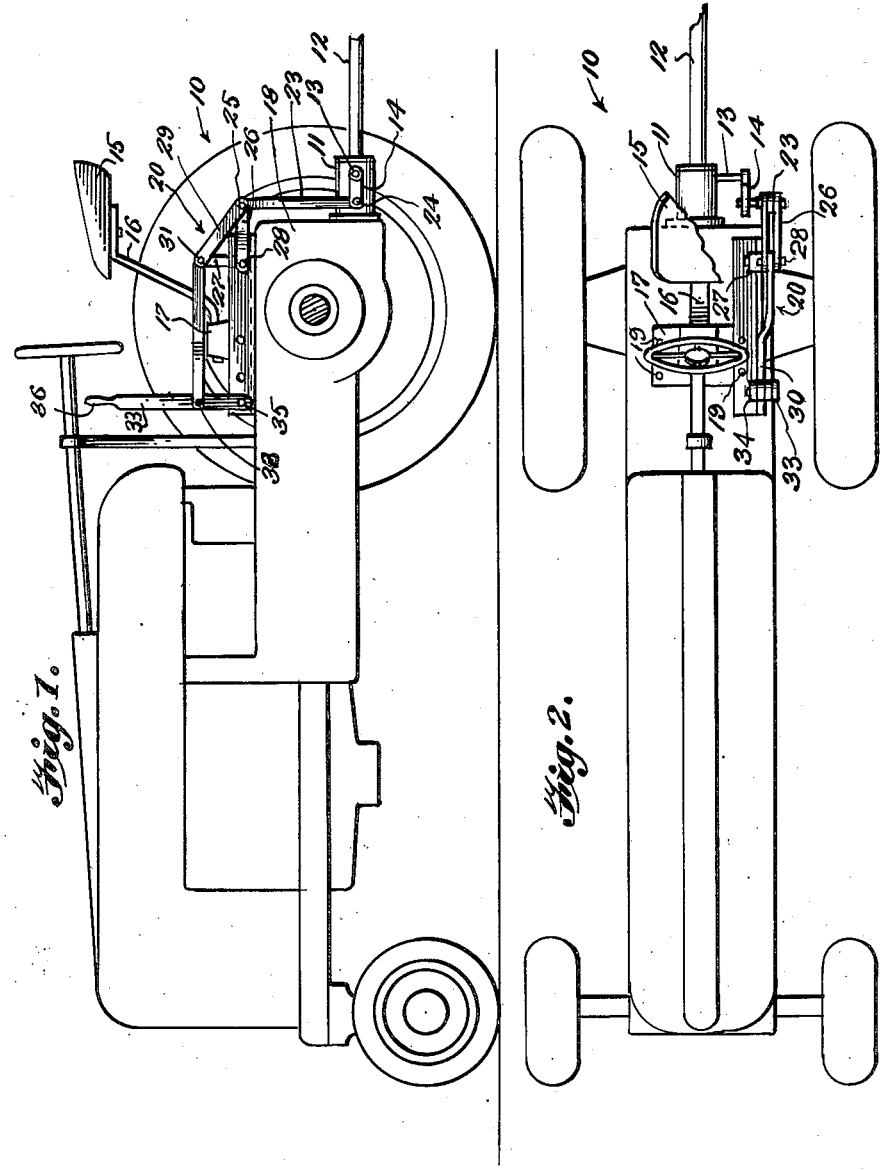
INVENTOR.
KENNETH R. HAVERKAMP
BY
*Patrick D. Beavers*
ATTORNEY Dec. 16, 1952 — K. R. HAVERKAMP — 2,621,536
POWER TAKE-OFF CONTROL
Filed May 11, 1951 — 2 SHEETS—SHEET 2
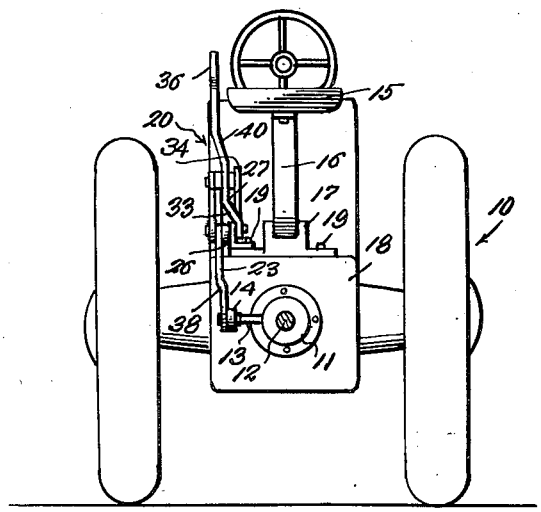
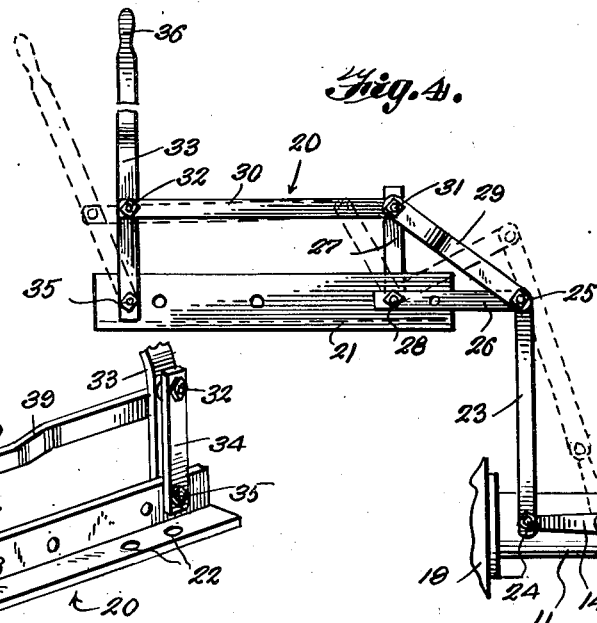
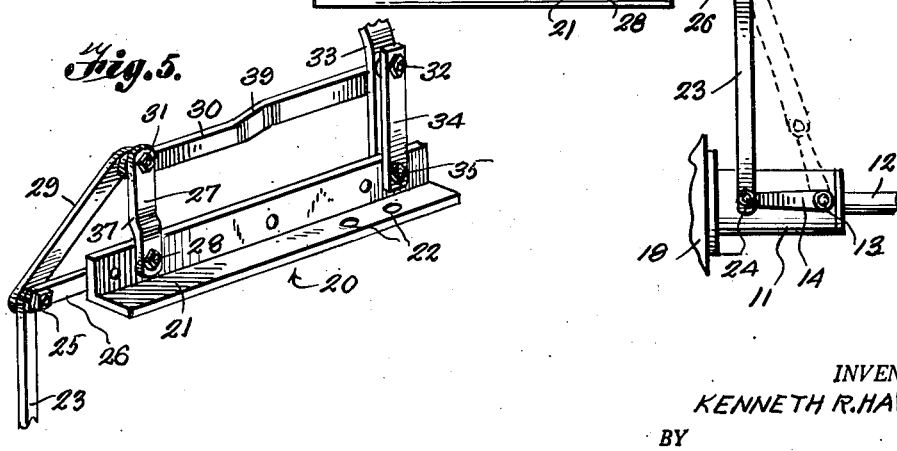
INVENTOR.
KENNETH R. HAVERKAMP
BY
Patrick D Beavers
ATTORNEY Patented Dec. 16, 1952

2,621,536

UNITED STATES PATENT OFFICE 2,621,536

POWER TAKE-OFF CONTROL

Kenneth R. Haverkamp, Seneca, Kans.

Application May 11, 1951, Serial No. 225,786

1 Claim. (Cl. 74—491)

This invention relates to conventional tractors having power take-offs and more particularly to an improved control therefor having provision for cutting the power take-off in and out of gear from the operator's station on the tractor.

An object of the present invention is to provide a control of the aforedescribed character which may be employed with conventional tractors without requiring any change, adaptation or modification of the structure thereof in mounting the control thereon.

Another object resides in the provision of a power take-off control which is readily and conveniently operable from the operator's seat on the tractor and attachable to the tractor by the bolts which secure the seat thereto.

A further object is to provide a power take-off control which is of simple construction comprising relatively few parts and in addition possesses all of the desired qualities of ease and economy of manufacture and ruggedness and reliability in operation.

Still other objects, advantages and features of the present invention will become more fully apparent from a perusal of the following description of a preferred embodiment thereof illustrated in the accompanying drawings wherein:

Figure 1 is a view in side elevation of a tractor having the power take-off control of the present invention mounted thereon;

Figure 2 is a plan view of the tractor and control illustrated in Figure 1;

Figure 3 is an end elevational view of the tractor and control illustrated in Figure 1;

Figure 4 is a somewhat enlarged view in elevation of the control as it appears in Figure 1, the positions of the control for putting the power take-off selectively in or out of gear being illustrated in the dashed lines and full lines respectively; and Figure 5 is a perspective view of the power take-off control per se.

Referring now to the drawings for a more complete understanding of the invention, the numeral 10 generally designates a tractor which may be of any type suitable for the purpose such, for example, as an International Harvester Co. Farmall H or M having a rear power take-off housing 11 from which extends a power take-off shaft 12 and a control shaft 13 having a crank arm 14 secured thereto.

It will be understood that clockwise rotation of control shaft 13 and crank arm 14 from their full line position to the dashed line position, as viewed in Figure 4, causes gearing (not shown) within the housing 11 to become engaged whereupon power is delivered to the shaft 12, and return movement of control shaft 13 and arm 14 to their full line position puts the power take-off out of gear whereupon transmission of power to shaft 12 is interrupted.

Tractor 10 also has a seat 15 which is secured to a leaf spring 16, in turn, secured to the mounting bracket 17. Seat bracket 17 is secured to the tractor housing 18 as by the bolts 19.

Bolts 19 on the left side of the tractor, as viewed in Figure 3, are employed to secure the power take-off control, generally designated 20, to the tractor, the control for this purpose comprising an elongated base member which preferably is an angle iron 21 having a pair of holes 22 for receiving the bolts 19, the spacing of holes 22 being substantially the same as the corresponding holes in seat bracket 17.

Control 20 also comprises a normally vertically disposed link 23 which is pivotally connected to crank arm 14 in any suitable manner as by the nut and bolt connection 24.

Link 23 at the upper end thereof is similarly pivotally connected as by the bolt and nut connection 25 to a normally horizontally disposed link 26 which together with a normally vertically disposed link 27 is pivotally secured as by the nut and bolt connection 28 to the angle iron 21, links 26 and 27 preferably being arranged on opposite sides of the upright leg of the angle iron in the manner illustrated.

It is desired that links or crank arms 26 and 27, in effect, operate as a bell crank, and to this end are interconnected by the brace member 29 which is secured at one end thereof to arm 26 and link 23 as by the pivot connection 25, link 23 preferably being positioned intermediate arm 26 and member 29, and is secured at the other end thereof to arm 27 and a connecting link 30 as by the nut and bolt pivotal connection 31, the link 30 preferably being interposed between arm 27 and brace member 29.

Connecting link 30 is arranged parallel to angle iron 21 and is connected pivotally at the forward end thereof as by the bolt and nut connection 32 to the hand lever 33 and the supporting arm 34, lever 33 preferably being interposed between arm 34 and link 30 and arms 27 and 34 being approximately the same effective length.

The lower extremities of lever 33 and arm 34 are disposed on opposite sides of the upstanding leg of angle iron 21 and are pivotally secured thereto as by the bolt and nut connection 35.

Hand lever 33 and arm 34 normally extend vertically upwardly and lever 33 at the upper extremity thereof is formed in a convenient hand gripping shape or portion 36 which is conveniently positioned within easy reach of the left hand of an operator occupying the seat 15.

It will be understood that the aforedescribed links, arms, and levers are offset in any suitable manner to produce an optimum force transmission and minimum strain, binding and friction on the pivotal connections. For example, arm 27 is offset as at 37, Figure 5, so that the upper portion of the arm is in the plane of arm 26. Similarly, link 23 is offset as at 38, Figure 3, link 30 is offset as at 39, Figures 2 and 5, and hand lever 33 is offset as at 40 as best appears in Figure 3.

When the hand lever is moved forward from the position as seen best in Figures 1 and 4 to the dashed line position in Figure 4, arms 26 and 27 are each moved through the same angle, arms 27 and 34 having the same effective length and the right triangular configuration of arms 26 and 27 being maintained by the member 29. This angular movement of arm 26 elevates link 23 whereupon arm 14 and shaft 13 are moved to the dashed line positions of Figure 4 wherein the power take-off is placed in gear.

From the foregoing it should now be apparent that a power take-off control has been provided which is well adapted to fulfill the aforestated objects of the invention and while only one example of the invention has been described with particularity, it will be understood that modifications and changes may be made in the structure disclosed without departing from the spirit and scope of the invention as defined by the claim appended hereto.

What I claim as my invention is:

In a tractor having a seat for the operator, a mounting bracket for said seat secured to the tractor by longitudinally aligned bolts, a power take-off shaft, a control shaft for cutting the power take-off shaft in and out of gear when the shaft is rotated to first and second rotational positions thereof respectively, and a crank arm carried by said control shaft and disposed horizontally when the control shaft is in said second position and substantially vertically when the control shaft is in said first position thereof, the combination of an elongated angle iron having a pair of openings in one leg thereof for receiving a pair of said bolts and spaced in matching relation to a pair of longitudinally aligned bolt holes in said bracket whereby said one leg of the angle iron is secured to the tractor by said pair of bolts and the other leg is disposed in upstanding relation thereon, an upwardly extending hand lever pivotally secured at the lower end thereof to said upstanding leg of the angle iron and on one side thereof, the other extremity of said hand lever terminating in a hand grip portion extended within easy reach of an operator occupying said seat, an upwardly extending arm disposed on the other side of said upstanding leg from the hand lever and pivotally secured therewith to the upstanding leg, a second upwardly extending arm pivotally secured to said upstanding leg of the angle iron and spaced therealong with respect to said first arm, a link pivotally connected at one end thereof to the upper extremity of said first arm and to said hand lever and pivotally connected at the other end thereof to said second arm at the upper extremity thereof, a horizontally extending arm pivotally secured at one end thereof with said second arm to said upstanding leg and disposed on the opposite side thereof from the second arm, a brace member interconnecting the extended extremities of said second arm and said horizontally extended arm, and a vertically disposed link pivotally connected at one end thereof to the extremity of said crank arm and pivotally connected at the other end thereof to said extremity of the horizontally extending arm whereby the crank arm is moved to said substantially vertical position thereof when the hand lever is pushed in a direction forwardly of the tractor.

KENNETH R. HAVERKAMP.

REFERENCES CITED

The following references are of record in the file of this patent:

UNITED STATES PATENTS

| Number | Name | Date |
|---|---|---|
| 319,737 | Manning | June 9, 1885 |
| 782,579 | Pelton | Feb. 14, 1905 |
| 989,708 | Heisler | Apr. 18, 1911 |
| 1,467,658 | Thompson | Sept. 11, 1923 |

FOREIGN PATENTS

| Number | Country | Date |
|---|---|---|
| 348,677 | Italy | May 25, 1937 |